United States Patent [19]
Graves

[11] Patent Number: 5,351,650
[45] Date of Patent: Oct. 4, 1994

[54] CAT TOY

[76] Inventor: David A. Graves, 3631 E. 55th St., Tulsa, Okla. 74135

[21] Appl. No.: 129,984

[22] Filed: Sep. 30, 1993

[51] Int. Cl.⁵ .......................................... A01K 29/00
[52] U.S. Cl. .................................. 119/707; 273/58 E
[58] Field of Search .............. 119/707, 711; 273/58 E, 273/58 F; 446/409, 419

[56] References Cited

U.S. PATENT DOCUMENTS

| | | | |
|---|---|---|---|
| 1,441,095 | 1/1923 | Kahnweiler | 119/711 |
| 2,499,483 | 3/1950 | Fox | 273/58 EX |
| 2,687,302 | 8/1954 | Stiegler | 273/58 E |
| 3,395,462 | 8/1968 | Sebree | 273/58 E |
| 3,418,749 | 12/1968 | Ayala | 446/419 |
| 3,648,403 | 3/1972 | Gommel | |
| 4,356,915 | 11/1982 | Phillips | 206/315 B |
| 4,595,369 | 6/1986 | Downs | 434/302 |
| 4,722,299 | 2/1988 | Mohr | 446/170 X |
| 5,009,193 | 4/1991 | Gordon | 446/170 X |
| 5,098,329 | 3/1992 | Tseng | 273/58 FX |

*Primary Examiner*—Robert P. Swiatek
*Attorney, Agent, or Firm*—Catalano, Zingerman & McKay

[57] ABSTRACT

A cat toy comprised of at least a partially transparent and generally spherical hollow external ball within which a second smaller opaque ball is suspended so as to form a uniform continuous gap between the two balls. The external ball is provided with an opening through which small balls having diameters only slightly smaller than the height of the gap may be inserted or removed from the gap. The opening is normally covered by a removable section. The external ball is also provided with at least one access opening having a diameter smaller than the diameter of the small balls but large enough to allow a cat to insert a single cat paw there through in order to bat at the small balls.

13 Claims, 3 Drawing Sheets

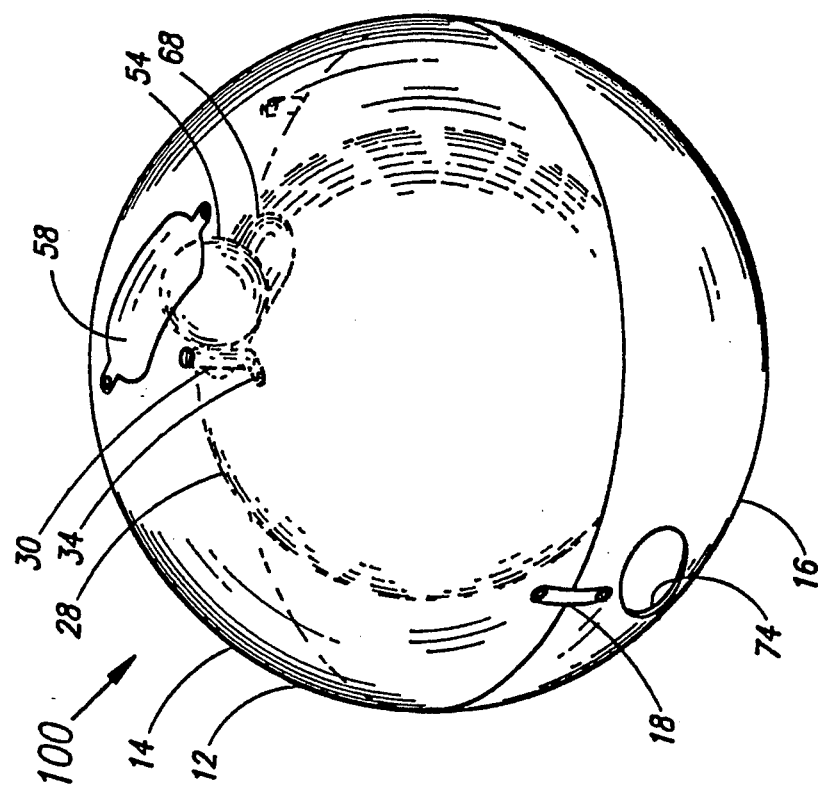
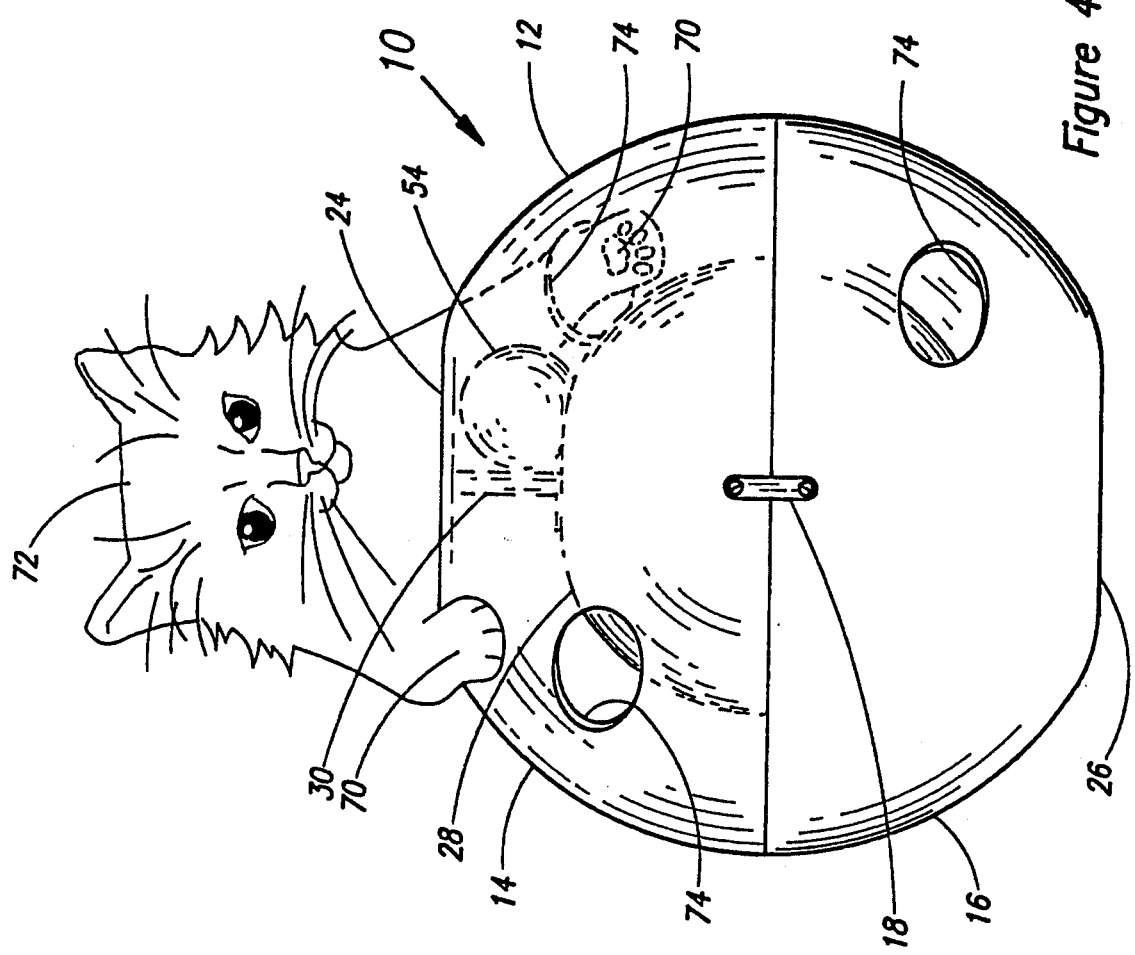

CAT TOY

Background Of The Invention

1. Field of the Invention

The present invention is a cat toy in the form of a totally or partially transparent exterior hollow shape within which an opaque second shape of similar contour to the first shape but of smaller dimension is suspended so that at least one small object or ball is movably confined within a gap defined between the two shapes. Additionally, the exterior shape is provided with a plurality of access openings so that a cat may insert its paws therethrough and interact with the small ball.

2. Description of the Related Art

Cats are inquisitive animals which will play for hours with toys which hold their interest. One way to hold a cat's interest is to include a moveable part which simulates movement of a mouse on or in the toy. Normally, this moveable part is round so that it will move easily under either the force of gravity or by being touched by the cat's paws. Also, it is desirable to have the cat toy designed so that the moveable part appears to hide periodically from the cat's view within the toy.

One problem with some cat toys is that they do not allow the cat to touch the moveable part with its paws. Cats become quickly bored with these kinds of toys since cats prefer to interact with the toys rather than just watch them.

Another problem with some previous cat toys is that the toys themselves are not easily moved, for example by the cat brushing against the toy. Rather, these toys require the cat to actively bat at the moveable part in order for any part of the toy to move. Cats become easily bored with these types of cat toys which have only one moveable part which moves in predictable ways in response to the cats' movements. The present invention addresses this problem by providing an easily moveable cat toy which contains a moveable part therein, thus providing unpredictable movement which holds the cat's interest.

Another problem with some previous cat toys is that they do not provide a means for allowing the cat to catch the moveable object and remove it from the toy. The present invention addresses this problem by providing an insertion and removal opening through which the moveable part can enter and exit the toy. The insertion and removal opening is closed by a removable section. By removing the removable section from the cat toy of the present invention, the moveable part is allowed to escape from the cat toy through the insertion and removal opening, thus allowing play to be varied in order to hold the cat's attention. Also, with the removable section removed, the cat may pull the movable part through the opening with its paws, adding another element of interest for the cat.

SUMMARY OF THE INVENTION

The present invention is a cat toy having a hollow exterior ball comprised of an upper exterior ball half and a lower exterior ball half which are fastened together with connectors to form the hollow exterior ball. These connectors are each provided with a hole in either end of the connector through which short connector screws insert to hold the two ball halves together. The upper exterior ball half is provided with a flattened external upper end and the lower exterior ball half is provided with a flattened external lower end. An interior ball is fastened within the hollow exterior ball by means of attachment members to form a continuous uniform gap between the hollow exterior ball and the interior ball.

Each of the attachment members is provided on one of its ends with tabs through which an opening is provided. Short tab screws insert through the openings and into pre-drilled threaded holes provided on the interior ball in order to secure the attachment members to the interior ball. These pre-drilled threaded holes are located on the interior ball at a flattened interior upper end and a flattened interior lower end. An opposite end of each attachment member is provided with a threaded opening. Attachment screws which insert through screw openings in the hollow exterior ball are received within the threaded openings of the attachment members so that the flattened external upper end is attached to the flattened interior upper end and the flattened external lower end is attached to the flattened interior lower end.

At least one small ball having a diameter slightly less than the height of the gap formed between the hollow exterior ball and the interior ball inserts into the gap through a ball insertion and removal opening provided on the upper exterior ball half. The ball insertion and removal opening is sufficiently large to allow the small ball and a pair of cat paws to be inserted therethrough simultaneously. A removable section removably covers the ball insertion and removal opening. The removable section is provided with an ear on each of its ends. Each of the ears is provided with an ear opening through which short ear screws insert and engage pre-drilled ear screw openings provided in the upper exterior ball half. The interior ball is provided with a shallow depression immediately below the ball insertion and removal opening.

The hollow exterior ball is provided with access openings which communicate through the hollow exterior ball into the gap. The diameter of each of these access openings is smaller than the diameters of the small balls so that the small balls are unable to exit through the access openings. The diameter of each access opening is sufficient to allow a single cat paw to enter therethrough. A second embodiment of the cat toy is identical to the previously described first embodiment of the cat toy except that the flattened external upper end, the flattened external lower end, the flattened internal upper end and the flattened internal lower end have been eliminated so that the hollow exterior ball and the interior ball are both generally spherical in shape.

BRIEF DESCRIPTION OF THE DRAWINGS

FIG. 4 is a side view of the cat toy of FIG. 1 showing a cat playing with the cat toy.

FIG. 5 is a perspective view of a cat toy constructed according to a second preferred embodiment of the present invention.

DETAILED DESCRIPTION OF THE PREFERRED EMBODIMENT

Figure 1:
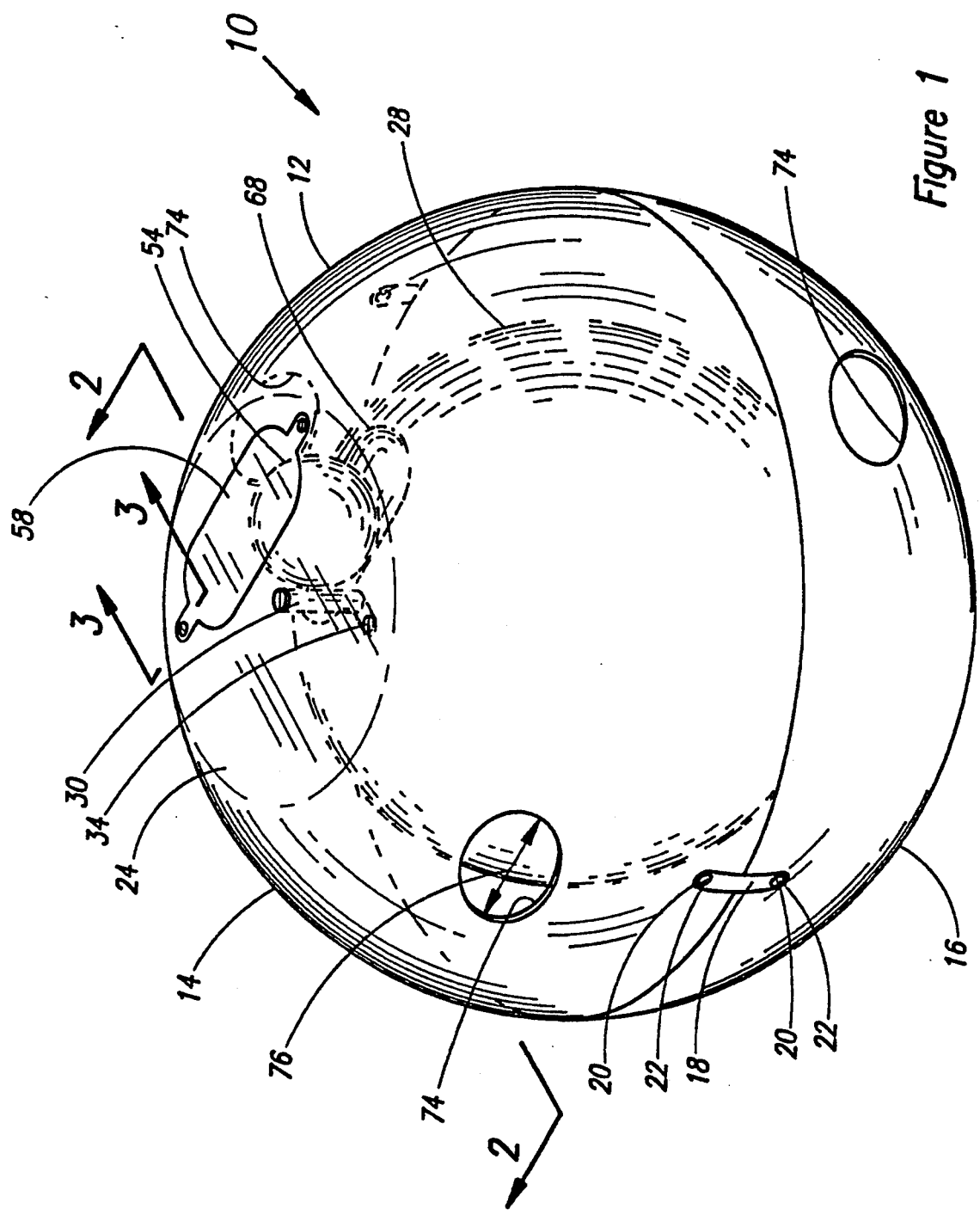
FIG. 1 is a perspective view of a cat toy constructed according to a preferred embodiment of the present invention.

Referring now to the drawings and initially to FIG. 1, there is illustrated a cat toy 10 constructed according to a preferred embodiment of the present invention. The cat toy 10 is provided with a hollow exterior ball 12 comprised of an upper exterior ball half 14 and a lower exterior ball half 16 held together by means of connectors 18. As shown in FIG. 1, each connector 18 is provided with a hole 20 on either end of the connector 18. Short connector screws 22 are inserted through the two holes 20 of each connector 18 and engage respectively the upper exterior ball half 14 and the lower exterior ball half 16, thereby removably securing the exterior ball halves 14 and 16 together to form the hollow external ball 12. It is important that the short connector screws 22 do not extend inwardly beyond the exterior ball 12 for reasons which will hereafter be made clear. The embodiment illustrated in FIGS. 1 through 4 has a flattened external upper end 24 provided on the upper exterior ball half 14 and a flattened external lower end 26 provided on the lower exterior ball half 16.

Figure 2:
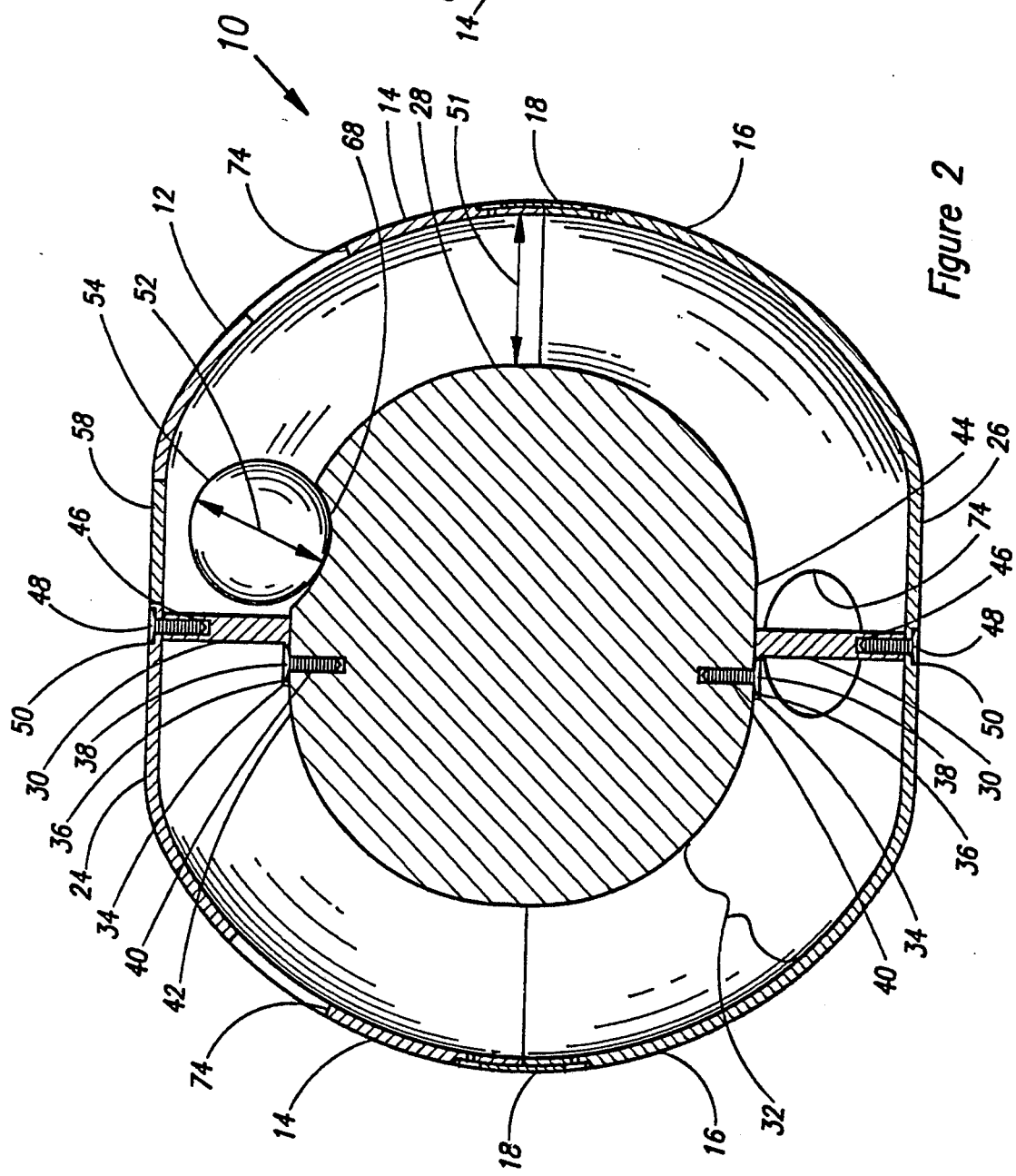
FIG. 2 is a cross-sectional view taken along line 2—2 of FIG. 1.

An interior ball 28 is located within the hollow exterior ball 12 and is held spaced apart from the exterior ball 12 by means of attachment members 30 so as to form a continuous uniform gap 32 between the exterior ball 12 and the interior ball 28. As best illustrated in FIG. 2, each of the attachment members 30 is provided at one end with the tab 34 having a tab opening 36 therein. Short tab screws 38 can be inserted through the tab openings 36 to engage pre-drilled threaded holes 40 provided respectively in a flattened interior upper end 42 and in a flattened interior lower end 44 of the interior ball 28.

Each of the attachment members 30 is provided at an opposite end with a threaded opening 46. Each of the threaded openings 46 removably receives an attachment screw 48 which is first inserted through a screw opening 50 provided in the exterior ball 12 prior to insertion into the threaded opening 46 of the attachment member 30. As illustrated in FIG. 2, the attachment member 30 which secures on one end to the flattened interior upper end 42 secures on its opposite end to the flattened external upper end 24. Likewise, the attachment member 30 which secures on one end to the flattened interior lower end 44 secures on its opposite end to the flattened external lower end 26.

To assemble the cat toy 10, the attachment members 30 are first secured to the inner ball 28 as previously described and then the exterior ball halves 14 and 16 are secured to the respective attachment members 30. Finally, the connectors 18 are attached to secure the exterior ball halves 14 and 16 to each other. To disassemble the cat toy 10 for cleaning, these steps are reversed.

Figure 3:
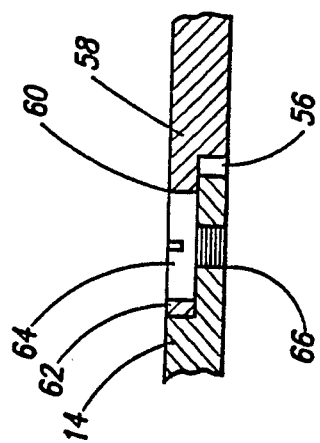
FIG. 3 is a cross-sectional view taken along line 3—3 of FIG. 1 which shows one of the tabs on the removable section.

The gap 32 created between the exterior ball 12 and the interior ball 28 has a height 51 which is only slightly larger than a diameter 52 of a lightweight small ball 54. The small ball 54 is removably introduced into the gap 32 by means of a ball insertion and removal opening 56 located in the flattened external upper end 24 of the upper exterior ball half 14 of the external ball 12. A removable section 58 normally covers the ball insertion and removal opening 56. The removable section 58 is provided with ear openings 60 located in ears 62 provided on either end of the removable section 58. Short ear screws 64 insert through the ear openings 60 to engage pre-drilled threaded ear screw openings 66 provided in the flattened external upper end 24, as best illustrated in FIGS. 1 and 3. It is important that the short ear screws 64 do not enter the gap 32 so that they do not interfere with the free movement of the small ball 54 therein. It is for this same reason that it is important that the short connector screws 22 do not enter the gap 32 as has previously been described.

A shallow depression 68 is provided in the flattened interior upper end 42 so that the depression 68 is located directly under the ball insertion and removal opening 56. This allows the small ball 54 to be placed in the depression 68 when it is inserted into the cat toy 10 via the ball insertion and removal opening 56. The ball insertion and removal opening 56 is large enough to permit the small ball 54 plus two cat paws 70 to simultaneously pass therethrough, thus giving the cat 72 an opportunity to remove the small ball 54 from the cat toy 10 when the removable section 58 is left detached from the cat toy 10. The ball insertion and removal opening 56 is rounded at its perimeter so that cat paws 70 are not injured as they pass therethrough.

The exterior ball 12 is provided with at least one, and normally a plurality of, access openings 74.

Each access opening 74 has an access opening diameter 76 which is smaller than the diameter 52 of the small ball 54 so that the small ball 54 cannot pass through the access openings 74. However, the access opening diameter 76 of each access opening 74 is large enough to allow only a single cat paw 70 to enter therethrough. The diameter 76 of each of the access openings 74 prevents the cat 72 from effectively inserting both of its paws 70 into an access opening 74. Each access opening 74 is rounded at its perimeter so that a cat's paw 70 is not injured as it passes through the access openings 74.

As illustrated in FIG. 4, these access openings 74 are spaced apart on the exterior ball 12 so that a cat 72 inserting its paws 70 through the access openings 74 is unable to trap the small ball 54 between its paws 70. The cat 72 will not be able to grasp the small ball 54 with a single paw 70 either because of the tight clearance of the small ball 54 within the gap 32. Therefore, the cat 72 will only be able to slap or bat at the small ball 54 with its paws 70.

Although the present invention encompasses a totally transparent cat toy (not illustrated), the interior ball 28 and the lower exterior ball half 16 are preferably opaque so that the cat 72 is unable to see the small ball 54 at times within the cat toy 10 as the small ball 54 travels within the gap 32 under the influence of gravity and in response to batting action of the cat's paws 70.

Figure 6:
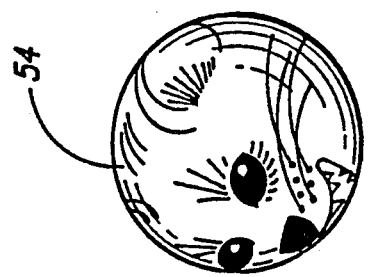
FIG. 6 is a side view of a small ball which has been painted to resemble a rodent.

In order to attract the cat 72, the small ball 54 may be painted with non-toxic paint so that it resembles a rodent, such as a rat or a mouse or other similar creature as illustrated in FIG. 6.

The flattened external upper and lower ends 24 and 26 also help keep the cat 72 interested in the cat toy 10 by causing the cat toy 10 to roll in a non-linear manner when bumped by the cat 72. The depression 68 allows the small ball 54 to come to rest on top of the interior ball 28 when the cat 72 bats the small ball 54 in just the right manner. Alternately, the small ball 54 may be placed in the depression 68 when the cat 72 isn't looking so that the small ball 54 is visible to the cat 72 the next time it happens upon the cat toy 10. Also, to keep the cat 72 interested in playing with the cat toy 10, the removable section 58 may be left detached from the cat toy 10, thus allowing the cat 72 to remove the small ball 54, or alternately, allowing the small ball 54 to escape from the cat toy 10 when the cat toy 10 is rolled over. Although not illustrated, additional small balls 54 may be introduced into the cat toy 10 to keep the cat 72 interested.

Although not illustrated, a scratch mat having retaining walls may be used with the cat toy 10 to prevent the cat 72 from scratching furniture or floors while playing with the cat toy 10. It is contemplated that the cat toy 10 would be placed on the scratch mat which would protect the floor from being scratched as the cat 72 plays with the cat toy 10, and the retaining walls on the scratch pad would prevent the cat toy 10 from rolling off the scratch mat.

Referring now to FIG. 5, a second embodiment cat toy 100 is illustrated. This second embodiment cat toy 100 is similar to the first embodiment cat toy 10 except that the exterior ball 12 and the interior ball 28 of the second embodiment cat toy 100 are spherical and do not have flattened ends 24, 26, 42 and 44.

Although the illustrated embodiments have been described in terms of generally ball-shaped cat toys, 10 and 100, other shapes are also contemplated and encompassed by the present invention. For example, an elongated cylindrical embodiment (not illustrated) would allow the small ball 54 to travel a further horizontal distance and the cat would chase the small ball 54 from one end of the elongated cylindrical embodiment (not illustrated) to an opposite end of the elongated cylindrical embodiment (not illustrated).

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A toy for use by a cat comprising:
   a hollow external ball,
   an interior ball suspended by attachment means within the hollow exterior ball so that a gap is defined between the exterior ball and the interior ball,
   at least one small ball having a diameter less than a height of the gap being provided within the gap, and
   the hollow exterior ball being comprised of an upper exterior ball half and a lower exterior ball half removably attached together by connector means.

2. (Amended) A toy according to claim 1 wherein the hollow exterior ball is provided with at least one access opening having a diameter less than the diameter of the at least one small ball.

3. A toy according to claim 2 further comprising the hollow exterior ball being provided with a ball insertion and removal opening having a diameter greater than the diameter of the at least one small ball, and a removable section removably attached to the hollow exterior ball so that it covers the ball insertion and removal opening.

4. A toy according to claim 3 further comprising the interior ball being provided with a depression so that the depression is directly below the ball insertion and removal opening.

5. A toy according to claim 5 further comprising a flattened external upper end being provided on the upper exterior ball half, a flattened external lower end being provided on the lower exterior ball half, and the interior ball being provided with a flattened interior upper end and a flattened interior lower end.

6. A toy according to claim 1 wherein the interior ball is opaque.

7. A toy according to claim 6 wherein the lower exterior ball half is opaque.

8. A toy according to claim 7 wherein the small ball is painted to resemble a rodent.

9. A cat toy comprising:
   a hollow exterior shape,
   an interior shape suspended by attachment means within the hollow exterior shape so that a gap is defined between the exterior and the interior shapes,
   at least one small object having a diameter less than a height of the gap being provided within the gap,
   the hollow exterior shape being provided with at least one access opening with a diameter less than a diameter of the at least one small object so that the at least one small object cannot pass through the at least one access opening,
   the hollow exterior shape being comprised of an upper exterior half and a lower exterior half removably attached together by connector means,
   the hollow exterior shape being provided with a small object insertion and removal opening having a diameter greater than the diameter of the at least one small object and a removable section removably secured to the hollow exterior shape so that it covers the small object insertion and removal opening.

10. A toy according to claim 9 further comprising the interior shape being provided with a depression so that the depression is directly below the small object insertion and removal opening.

11. A toy according to claim 10 wherein the interior shape is opaque.

12. A toy according to claim 11 wherein the lower exterior half is opaque.

13. A toy according to claim 12 wherein the at least one small object is painted to resemble a rodent.

* * * * *